United States Patent
Foladare et al.

(10) Patent No.: US 6,574,480 B1
(45) Date of Patent: Jun. 3, 2003

(54) METHOD AND APPARATUS FOR PROVIDING INTELLIGENT EMERGENCY PAGING

(75) Inventors: Mark J. Foladare, East Brunswick, NJ (US); Shelley B. Goldman, East Brunswick, NJ (US); David P. Silverman, Piscataway, NJ (US); Shaoqing Q. Wang, Morganville, NJ (US); Roy P. Weber, Bridgewater, NJ (US); Robert S. Westrich, Middletown, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/458,633

(22) Filed: Dec. 10, 1999

(51) Int. Cl.[7] .............................................. H04M 11/00
(52) U.S. Cl. ....................... 455/458; 455/404; 455/521; 379/37; 379/45; 340/7.5
(58) Field of Search ................................. 455/458, 422, 455/426, 404, 515, 521, 3.01; 379/37, 41, 45, 51; 340/286.07, 7.5, 7.1

(56) References Cited

U.S. PATENT DOCUMENTS 6,167,255 A * 12/2000 Kennedy, III et al. ...... 455/404
6,201,856 B1 * 3/2001 Orwick et al. ................ 379/45
6,295,346 B1 * 9/2001 Markowitz et al. ........... 379/37

* cited by examiner

Primary Examiner—William Trost
Assistant Examiner—Simon Nguyen

(57) ABSTRACT

A method and apparatus for providing intelligent paging services is disclosed. A server receives a paging request from a customer. The page request may be, for example, a telephone call initiated by the customer from a telephone. The server then determines the identity of the customer who initiated the page request and (if necessary) the condition which prompted the identified customer to initiate the page request. The identity and condition information is then used to identify a predetermined list of one or more parties who should be contacted on behalf of the customer and how they should be contacted. Examples of the contact methods the server may execute include making a telephone call to a designated number via a public switched telephone network (PSTN), sending a page to a designated pager via the PSTN, and/or sending an electronic mail (e-mail) message to an Internet protocol (IP) addressable device via an IP network.

22 Claims, 2 Drawing Sheets

METHOD AND APPARATUS FOR PROVIDING INTELLIGENT EMERGENCY PAGING

BACKGROUND

The present invention relates to a method and apparatus for providing intelligent paging services. More particularly, the present invention relates to a method and apparatus for automating the process of notifying people upon the sudden occurrence of an event.

People affected by the sudden occurrence of a particular event (such as an emergency situation), frequently have a need to inform others that the event has occurred. For example, a pregnant woman who suddenly enters labor may wish to notify her doctor, her husband, and/or other relatives. In another example, an employee may wish to inform a software technician, a supervisor, and other co-workers when a network computer system crashes.

Currently, people are "manually" notified about the occurrence of events such as those described above. Manual notification may begin with an originating person making a telephone call, sending a page, or sending an electronic mail (e-mail) message to one or more other people. These telephone call, page, or e-mail recipients may then contact other people who should be informed of the occurrence of the event.

One of the drawbacks of the manual notification method is the amount of time required to sequentially inform each person of the emergency situation. Another drawback is that the originator must somehow quickly obtain (or remember) a list of people who should be notified and obtain (or remember) a telephone number, a pager number, or an e-mail address for each person. If a key person is unable to be reached through the first notification means, alternate notification means must also be available to the originator. The above notification activity places an additional burden on a person who is likely also required to handle the unexpected event.

One method for shifting the notification burden from the person involved in the unexpected event is known as The Companion Service®, available from the Ameritech Corporation. The Companion Service® comprises a small transmitter, a receiver adapted to be connected to a telephone line, and a monitoring station. The transmitter may be worn around a customer's neck or attached to the customer's clothing. The transmitter includes one or more buttons which, when depressed, cause the transmitter to transmit a signal to the receiver. The receiver is connected to the public switched telephone network (PSTN) via a telephone line within the customer's home or another premises occupied by the customer. The monitoring station includes a means for receiving telephone calls (such as a telephone) and one or more human operators.

In the event of an emergency, the Companion Service® customer depresses one of the transmitter buttons and thus causes the transmitter to transmit a signal to the receiver. Upon receiving a signal from the transmitter, the receiver utilizes the PSTN to complete a telephone call to the monitoring station. Various equipment or a human operator at the monitoring station use the incoming telephone call to identify both the person assigned to the originating transmitter and the location from which the transmitter signal originated. The human operator then dials 911 and summons medical personnel to the customer's location.

One of the drawbacks of the Companion Service® is that the service only notifies one entity of the emergency situation. Many emergency situations require notifying more than one party or entity. As mentioned above with reference to the scenario where the computer system crashes, the following people may need to be notified: a software technician, a supervisor, and other co-workers.

SUMMARY OF THE INVENTION

The present invention provides a method and apparatus for providing intelligent paging services. According to one embodiment of the present invention, a server receives a paging request from a customer. The page request may be, for example, a telephone call initiated by the customer from a telephone. The server then determines the identity of the customer who initiated the page request and (if necessary) the condition which prompted the identified customer to initiate the page request. The identity and condition information is then used to identify a predetermined list of one or more parties who should be contacted on behalf of the customer and how they should be contacted. Examples of the contact methods the server may execute include making a telephone call to a designated number via a public switched telephone network (PSTN), sending a page to a designated pager via the PSTN, and/or sending an electronic mail (e-mail) message to an Internet Protocol (IP) addressable device via an IP network.

In view of the above, it can be appreciated that there is a need for a method and apparatus which solves the above described problems.

DETAILED DESCRIPTION

The present invention relates to a method and apparatus for automating the process of notifying people upon the sudden occurrence of an event such as an emergency. Upon receiving a call from a customer, the system in accordance with one embodiment executes a predetermined series of actions which may include contacting a list of people via telephone, pager, or e-mail.

Figure 1:
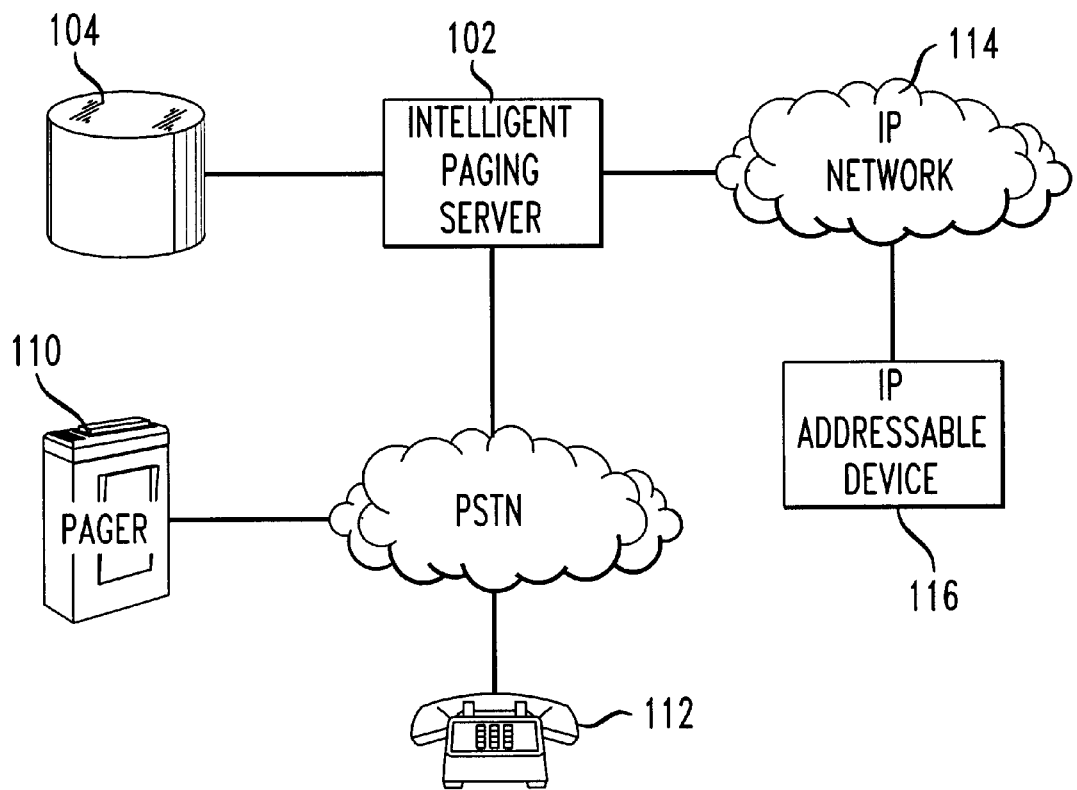
FIG. 1 is a block diagram of a system suitable for practicing one embodiment of the present invention.

FIG. 1 is a block diagram of a system suitable for practicing one embodiment of the present invention. In FIG. 1, an intelligent paging server 102 is adapted to be connected to a database 104. Intelligent paging server 102 may be, for example, a UNIX or Windows server modified as described below with reference to FIG. 2. Database 104 may be, for example, an Oracle or Informix database. Intelligent paging server 102 is adapted to be connected to a telephone network such as the public switched telephone network (PSTN) 106. A pager 110 and a telephone 1 12 are each adapted to communicate with other devices via PSTN 106. Intelligent paging server 102 is also adapted to be connected to an Internet Protocol (IP) network 114, such as the Internet. An IP addressable device 116, such as a general purpose computer, is adapted to be connected to IP network 114.

Figure 2:
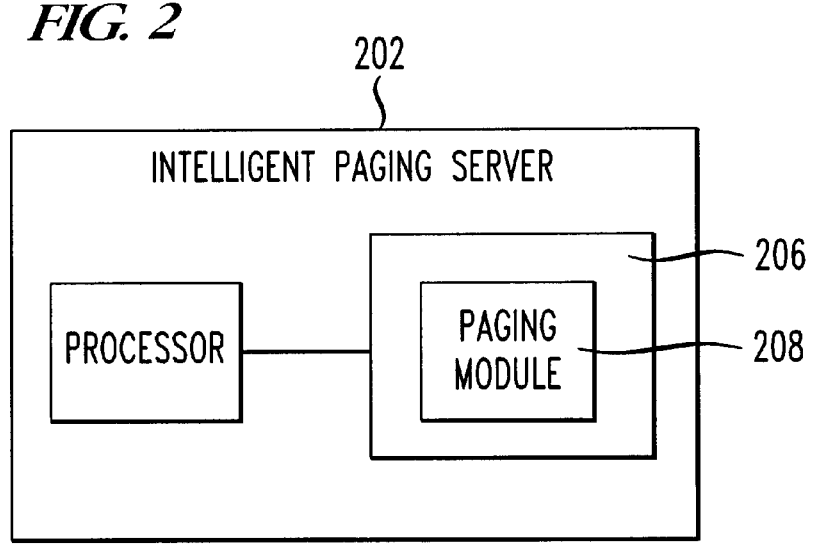
FIG. 2 is a block diagram of an intelligent paging server in accordance with an embodiment of the present invention.

FIG. 2 is a block diagram of an intelligent paging server in accordance with an embodiment of the present invention. In FIG. 2, an intelligent paging server 202 comprises a processor 204 adapted to be connected to a computer readable memory 206. Computer readable memory 206 stores computer program code segments which, when executed by processor 204, implement the main functionality for this embodiment of the invention. These computer program code segments are included within a paging module 208. Although in this embodiment of the invention, the computer program code segments are shown in one module, it can be appreciated that this module can be further separated into more modules and still fall within the scope of the invention.

Before the invention may be used to provide intelligent paging services, users provide information to be stored in files within database 104. These files enable the user to custom tailor the system's response to events the user identifies. For the purpose of an example, assume intelligent paging server 102 supports a web site which prompts users for paging information. In accordance with one embodiment of the present invention, a user utilizes a general purpose computer (such as IP addressable device 116 and IP network 114) to access the uniform resource locator (URL) for the web site supported by intelligent paging server 102. Paging module 208 then enables the user to download both a form and a program written in a programming language (such as Java) from the web site to IP addressable device 116. The Java program is executed by the processor on IP addressable device 116. The Java program enables the user to interactively provide the information required to complete the downloaded form. Paging module 208 receives the information input by the user into the downloaded form and stores the information within database 104.

The process of filling out the downloaded form results in a file created for the user within database 104. The Java program thus prompts the user to identify events to which the system should respond, the people who should be notified, and the methods for contacting these people. For example, a user may identify an event as his wife going into labor. The user may then enter the people the system should identify and how to contact these people. For example the user may enter the following contact instructions: send a page to the doctor, telephone the user, and e-mail other relatives. The user may draft the content of the e-mail message and include this message with the file. For example, the user may store an e-mail message which states: "Judy is going into labor." The system may then send this e-mail message to the relatives when the user contacts the system as described below.

In another embodiment, the user may create a file by dialing a telephone number and verbally giving the information to a live operator who utilizes a keyboard to enter the information into database 104. In yet another embodiment, the user may verbally enter the information over a telephone in response to voice prompts from paging module 208 and voice recognition software. In this embodiment, voice recognition technology is utilized to convert the user's spoken words into corresponding data which may be stored within the file. Utilizing the verbal method, the user may be able to pre-record a message which informs the recipient that a particular event has occurred. For example, after being contacted by "Judy" who has gone into labor, the system may call the user and play a pre-recorded message which states "Judy has gone into labor."

Figure 3:
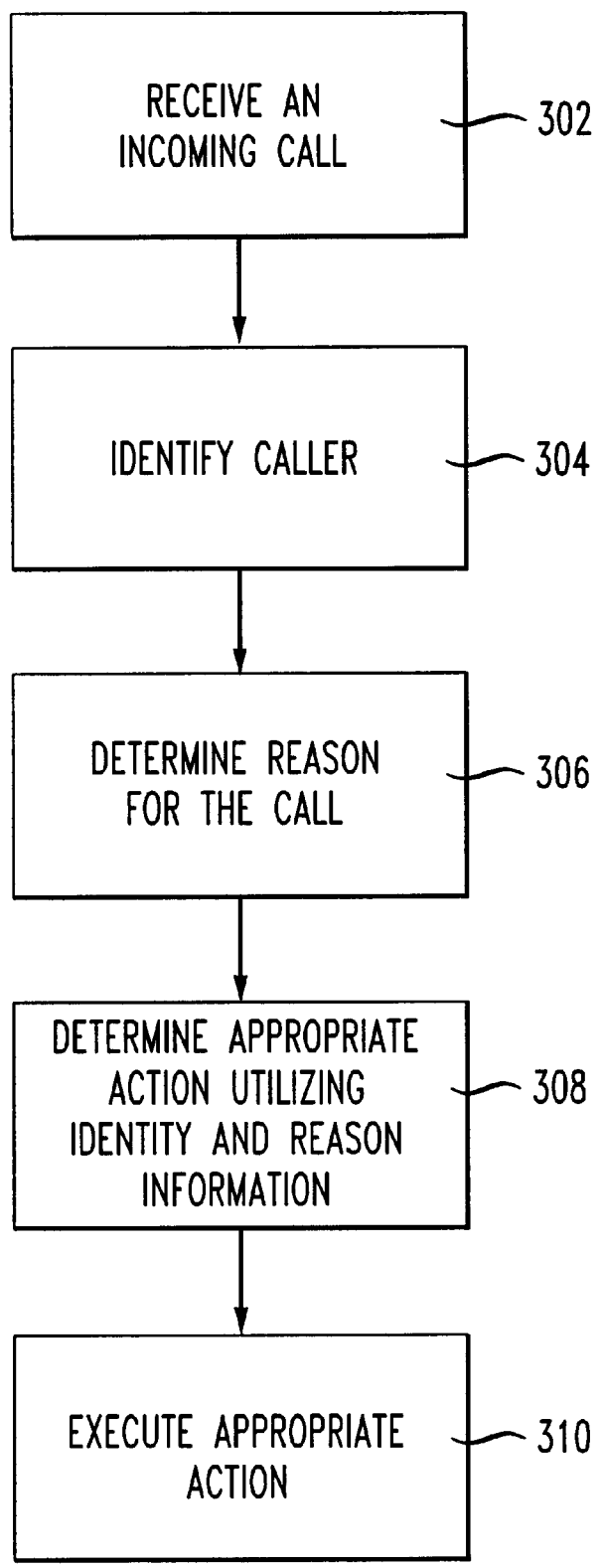
FIG. 3 illustrates a flow chart with steps for providing intelligent paging services in accordance with one embodiment of the present invention.

FIG. 3 illustrates a flow chart with steps for providing intelligent paging services in accordance with one embodiment of the present invention. These steps may be implemented, for example, as a computer program or as computer hardware using well-known signal processing techniques. If implemented in software, the computer program instructions are stored in computer readable memory, such as Read-Only Memory (ROM), Random Access Memory (RAM), magnetic disk (e.g, 3.5" diskette or hard drive), optical disk (e.g., CD-ROM) and so forth. In accordance with one embodiment of the present invention, the computer program instructions are included within paging module 208 and executed by processor 204 within intelligent paging server 102.

In step 302 of FIG. 3, Intelligent paging server 102 receives an incoming telephone call from a customer who has experienced the occurrence of an event which requires the notification of other individuals. This call may be received via a telephone connected to PSTN 106.

In step 304, the system determines the identity of the caller. In one embodiment of the present invention, the caller may be identified using automatic number identifier information (ANI). As used herein, the term ANI is understood to encompass any information which is transmitted with a telephone call which contains information concerning the dialing location from which a call originates. This information may be, for example, "caller ID" information or similar information. In another embodiment of the present invention, the system determines the identity of the caller using dialed number identification service (DNIS) information. DNIS information identifies a caller based upon the number dialed. Thus, each customer accesses intelligent paging server 102 using an individually assigned telephone number. In another embodiment of the present invention, the caller may be identified by prompting the caller to respond to one or more queries using dual tone multi frequency (DTMF) information. The customer sends DTMF information to the system by depressing appropriate buttons on a touch tone telephone. In another embodiment, customers may identify themselves by depressing buttons on a touch tone telephone to enter a personal identification number (PIN) assigned to the customer. In yet another embodiment of the present invention, the caller may be identified using voice recognition techniques. In this embodiment, intelligent paging server 102 is modified to include a speech engine such as ViaVoice by the IBM corporation. The speech engine analyzes voice signals received within the incoming telephone call to identify customers of the system.

Once the caller has been identified, in step 306, the system determines the reason for the call. The call may have been placed, for example, because a medical emergency has taken place or because a computer system has crashed. The system may determine the reason for the call using one or more of the techniques described above with reference to step 304. For example, in response to prompts from the system, the caller may dial a "1" on their touch tone telephone to indicate that the caller has entered labor.

After the system has identified the caller and the reason for the call, the system proceeds to step 308 and uses this information to determine the appropriate action. This step may entail, for example, searching database 104 for a file which corresponds to the determined identification and reason information. This file includes a series of actions previously determined by the customer. For example, the customer may have constructed a file which instructs the system to telephone emergency medical personnel, send a page to a particular doctor, telephone a spouse at work, and send an e-mail message to one or more relatives in the event the customer calls into the system and indicates she has gone into labor. The same customer may have constructed a different file which includes different actions in the event the customer calls into the system and indicates the computer system at work has crashed. The actions within the file may also include a step which attempts to contact an individual through an alternative method if the intended party does not acknowledge receipt of the first contact attempt within a specified period of time.

In another embodiment of the present invention, the system includes the ability to modify a person's calendar in the event of an emergency situation. For example, intelligent server 102 may access an electronic calendar stored on line (such as the Outlook calendar available from the Microsoft Corporation) via an IP network, retrieve telephone numbers for people involved in particular appointments entered on the calendar, and call those involved to inform them the appointments have been canceled.

Once the appropriate actions have been identified, in step 310, the system executes these actions. Thus, the intelligent paging server 102 may complete a telephone call to one party via PSTN 106, send a page to another party via the PSTN and/or send an e-mail message to another party via IP network 114.

Although several embodiments are specifically illustrated herein, it will be appreciated that modifications and variations of the present invention are covered by the above teachings and within the purview of the appended claims without departing from the spirit and intended scope of the invention. For example, in step 302 of FIG. 3, the system may be initially notified of an emergency situation via a pager such as pager 110 of FIG. 1 or via a data message received from an IP addressable device connected to an IP network such IP addressable device 116 of FIG. 1.

What is claimed is:

1. A method for use by an intelligent paging system in response to receipt by said system of a page request initiated by a user, the method comprising
    receiving, in response to a prompt provided to said user, identification of an event from among one or more events that, at a time prior to the initiation of said page request, were defined by said user and were not pre-defined in said system at that time, and
    executing an action that was identified by said user, at a time prior to the initiation of said page request, as being an action to be taken upon the occurrence of said identified event, said action including notification of at least one party of the occurrence of said event.

2. The method of claim 1 comprising the further steps, performed upon receipt of said page request, of
    determining the identity of said user, and
    providing said prompt to said user.

3. The method of claim 2 wherein said page request comprises a telephone call initiated by said user and wherein said prompt is provided to said user over said telephone call.

4. The method of claim 3 wherein said action is at least one of:
    establishing a telephone call to a specified telephone;
    initiating a page to a specified pager;
    transmitting an electronic mail (e-mail) message; and
    altering a specified calendar.

5. A method for use by a paging services system, the method comprising:
    receiving information from a person defining a condition not pre-defined in said system, said information further defining a paging operation associated with said condition, said paging operation being such as to notify at least one party of said condition;
    receiving a page request from said person, said page request including an identification of said condition; and
    executing, in response to said identification of said condition, the associated paging operation, said condition being identified at least in part by information other than a telephone number that was dialed in order to initiate said page request.

6. The invention of claim 5 further comprising prompting said person, in response to receipt of said page request, to identify said condition.

7. The invention of claim 5 further comprising determining the identity of the person who initiated said page request using at least one of automatic number identifier (ANI) information, dialed number identification service (DNIS) information, dual tone multi frequency (DTMF) information, personal identification number (PIN) information, and voice recognition information.

8. The invention of claim 5, wherein said step of executing said associated paging operation includes at least one of the following steps:
    establishing a telephone call to a specified telephone via one of a public switched telephone network (PSTN) and an Internet protocol (IP) network;
    initiating a page to a specified pager via a paging network;
    transmitting an electronic mail (e-mail) message to a specified IP addressable device via an IP network; and
    altering a specified calendar.

9. The method of claim 5, wherein said page request is received via one of a pager, a telephone, and a general purpose computer.

10. A method for use by a paging services system, the method comprising:
    receiving from each of a plurality of persons information defining an event associated with that person and not pre-defined in said system, said information further defining a paging operation associated with said event, said paging operation being such as to notify at least one party of said event;
    receiving a page request from an individual one of said persons,
    determining the identity of the person from whom said page request was received, said page request including an identification of the event associated with said individual one of said persons; and
    executing, in response to said identification of said identified event, the associated paging operation.

11. The invention of claim 10 wherein said identified event is identified at least in part by information other than a telephone number that was dialed in order to initiate said page request, and wherein said method further comprises prompting said person, in response to receipt of said page request, to identify said event.

12. The invention of claim 11 wherein the identity of the person who initiated said page request is determined using at least one of automatic number identifier (ANI) information, dialed number identification service (DNIS) information, dual tone multi frequency (DTMF) information, personal identification number (PIN) information, and voice recognition information.

13. The invention of claim 12, wherein said step of executing said associated paging operation includes at least one of the following steps:
    establishing a telephone call to a specified telephone via one of a public switched telephone network (PSTN) and an Internet protocol (IP) network;

initiating a page to a specified pager via a paging network;

transmitting an electronic mail (e-mail) message to a specified IP addressable device via an IP network; and altering a specified calendar.

14. The method of claim 13, wherein said page request is received via one of a pager, a telephone, and a general purpose computer.

15. A system for implementing intelligent emergency paging services comprising a storage medium in which are stored computer program code segments, and further comprising a server adapted to execute said computer program code segments, said computer program code segments implementing the steps of:

receiving from each of a plurality of persons information defining a respective condition not pre-defined in said system, said information farther defining a paging operation associated with said condition, said paging operation being such as to notify at least one party of said condition;

receiving a page request from an individual one of said persons, said page request including an identification of the condition defined in the information previously received from said individual one of said persons; and executing, in response to said identification of said condition, the associated paging operation, said condition being identified at least in part by information other than a telephone number that was dialed in order to initiate said page request.

16. The invention of claim 15 wherein said computer program segments implement the further step of prompting said person, in response to receipt of said page request, to identify said condition.

17. The invention of claim 15 wherein said computer program segments implement the further step of determining the identity of the person who initiated said page request using at least one of automatic number identifier (ANI) information, dialed number identification service (DNIS) information, dual tone multi frequency (DTMF) information, personal identification number (PIN) information, and voice recognition information.

18. The invention of claim 15 wherein said step of executing said associated paging operation includes at least one of the following steps:

establishing a telephone call to a specified telephone via one of a public switched telephone network (PSTN) and an Internet protocol (IP) network;

initiating a page to a specified pager via a paging network;

transmitting an electronic mail (e-mail) message to a specified IP addressable device via an IP network; and altering a specified calendar.

19. A computer-readable medium whose contents cause a computer system to provide intelligent paging services, by performing the steps of:

receiving information from a person defining one or more conditions not pre-defined in said system, said information further defining a paging operation associated with each said condition, each said paging operation being such as to notify at least one party of the associated condition;

receiving a page request from said person, said page request including an identification of one of said conditions; and executing, in response to said identification of one of said conditions, the associated paging operation, said identified condition being identified at least in part by information other than a telephone number that was dialed in order to initiate said page request.

20. The invention of claim 19 wherein said contents cause said computer system to perform the further step of prompting said person, in response to receipt of said page request, to identify said condition.

21. The invention of claim 20 wherein said contents cause said computer system to perform the further step of determining the identity of the person who initiated said page request using at least one of automatic number identifier (ANI) information, dialed number identification service (DNIS) information, dual tone multi frequency (DTMF) information, personal identification number (PIN) information, and voice recognition information.

22. The invention of claim 21 wherein said step of executing said associated paging operation includes at least one of the following steps:

establishing a telephone call to a specified telephone via one of a public switched telephone network (PSTN) and an Internet protocol (IP) network;

initiating a page to a specified pager via a paging network;

transmitting an electronic mail (e-mail) message to a specified IP addressable device via an IP network; and altering a specified calendar.

* * * * *